(12) United States Patent
Mueller et al.

(10) Patent No.: US 10,469,828 B2
(45) Date of Patent: Nov. 5, 2019

(54) THREE-DIMENSIONAL DENSE STRUCTURE FROM MOTION WITH STEREO VISION

(71) Applicant: Texas Instruments Incorporated, Dallas, TX (US)

(72) Inventors: Martin Fritz Mueller, Richardson, TX (US); Aziz Umit Batur, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 380 days.

(21) Appl. No.: 15/202,841

(22) Filed: Jul. 6, 2016

(65) Prior Publication Data

US 2017/0019655 A1   Jan. 19, 2017

Related U.S. Application Data

(60) Provisional application No. 62/191,711, filed on Jul. 13, 2015.

(51) Int. Cl.

| | |
|---|---|
| *H04N 13/218* | (2018.01) |
| *H04N 13/128* | (2018.01) |
| *B60R 1/00* | (2006.01) |
| *G06T 7/579* | (2017.01) |
| *G06T 7/593* | (2017.01) |
| *H04N 13/221* | (2018.01) |
| *H04N 13/111* | (2018.01) |
| *H04N 13/00* | (2018.01) |

(52) U.S. Cl.
CPC ............ *H04N 13/218* (2018.05); *B60R 1/00* (2013.01); *G06T 7/579* (2017.01); *G06T 7/593* (2017.01); *H04N 13/111* (2018.05); *H04N 13/128* (2018.05); *H04N 13/221* (2018.05); *B60R 2300/107* (2013.01); *G06T 2207/30244* (2013.01); *H04N 2013/0081* (2013.01); *H04N 2013/0085* (2013.01)

(58) Field of Classification Search
None
See application file for complete search history.

(56) References Cited

PUBLICATIONS

Hirschmuller, Heiko, "Stereo Processing by Semiglobal Matching and Mutual Information", IEEE Transactions on Pattern Analysis and Machine Intelligence, pp. 328-341, vol. 30, No. 2, Feb. 2008.

(Continued)

*Primary Examiner* — James M Anderson, II
(74) *Attorney, Agent, or Firm* — Ebby Abraham; Charles A. Brill; Frank D. Cimino

(57) ABSTRACT

Disclosed examples include three-dimensional imaging systems and methods to reconstruct a three-dimensional scene from first and second image data sets obtained from a single camera at first and second times, including computing feature point correspondences between the image data sets, computing an essential matrix that characterizes relative positions of the camera at the first and second times, computing pairs of first and second projective transforms that individually correspond to regions of interest that exclude an epipole of the captured scene, as well as computing first and second rectified image data sets in which the feature point correspondences are aligned on a spatial axis by respectively applying the corresponding first and second projective transforms to corresponding portions of the first and second image data sets, and computing disparity values of a stereo disparity map according to the rectified image data sets to construct.

20 Claims, 5 Drawing Sheets

(56) References Cited

PUBLICATIONS

Geiger, Andreas et al., "Vision Meets Robotics: The Kitti Dataset", The International Journal of Robotics Research 32(11):1231-1237, pp. 1-6, Aug. 2013.
Unger, Christian et al., "Parking Assistance Using Dense Motion-Stereo" "Real-Time Parking Slot Detection, Collision Warning and Augmented Parking", Machine Vision and Applications (2014) 25:561-581.
Bay, Herbert et al., "Speeded-Up Robust Features (SURF)", Elsevier, ScienceDirect, Computer Vision and Image Understanding 110 (2008) pp. 346-359.
Lucas, Brian D. et al., "An Iterative Image Registration Technique With an Application to Stereo Vision", IJCAI Paper, Proc. 7th Intl. Joint Conf. on Artificial Intelligence (IJCAI), Aug. 24-28, 1981, pp. 674-679.
Baker, Simon et al., "A Database and Evaluation Methodology for Optical Flow", Int. J. Comput. Vis (2011) 92: 1-31.
Hartley, R. et al., "Multiple View Geometry in Computer Vision", Cambridge University Press, 2003.
Trucco, E. et al., "Introductory Techniques for 3-D Computer Vision", vol. 201, Englewood Cliffs: Prentice Hall, 1998, Ch. 7.3.7. "Rectification".

THREE-DIMENSIONAL DENSE STRUCTURE FROM MOTION WITH STEREO VISION

REFERENCE TO RELATED APPLICATION

Under 35 U.S.C. § 119, this application claims priority to, and the benefit of, U.S. Provisional Patent Application Ser. No. 62/191,711 that was filed on Jul. 13, 2015 and is entitled "DENSE STRUCTURE FROM MOTION WITH STEREO VISION", the entirety of which is incorporated by reference herein.

BACKGROUND

Structure from Motion (SfM) relates to reconstructing a 3-dimensional (3D) scene from multiple images obtained from a single moving camera. High resolution or dense SfM methods are computationally expensive due to algorithmic complexity. Sparse reconstruction techniques reconstruct fewer 3D points than the total number of original image pixels, but many applications require high-density reconstruction in real time. Moreover, front or rear mounted vehicle camera applications present unique challenges to reconstruction accuracy and computational load for obstacle detection, vehicle control, environment mapping or other end usage of a reconstructed 3D scene.

SUMMARY

Disclosed examples implement stereo vision techniques to extract three-dimensional information from multiple temporally spaced images captured by a single camera. A disclosed method includes determining motion of a camera, computing pairs of first and second projective transforms that individually correspond to regions of interest that exclude a scene epipole. The method further includes computing first and second rectified image data sets in which the feature point correspondences are aligned on a spatial axis by respectively applying the corresponding first and second projective transforms to corresponding portions of the first and second image data sets, and computing disparity values of a stereo disparity map according to the rectified image data sets to construct. Three-dimensional depth values can be computed according to the disparity map values. In certain examples, the regions of interest include peripheral upper, lower, left and right regions that exclude a scene epipole, as well as a central region that includes the epipole. The method may include computing the pairs of first and second projective transforms and the first and second rectified image data sets for only the regions of interest that exclude the epipole to conserve processing resources and to avoid the singularity at the epipole. In certain examples, the essential matrix is computed using a subset of the image pixel locations to conserve computational resources. The feature point correspondences and the essential matrix can be computed using a processor, and the projective transforms and the rectified image data sets are computed using a hardware accelerator circuit in certain examples to facilitate real-time operation for obstacle detection, vehicle control, environment mapping and other applications.

Imaging systems are disclosed which include a single camera to obtain first and second image data sets at corresponding first and second times, as well as a video processor with a memory and a processor programmed to store the first and second image data sets in the electronic memory. The video processor computes feature point correspondences between the first and second image data sets, and an essential matrix that characterizes relative positions of the single camera at the first and second times according to the feature point correspondences. The video processor computes first and second projective transform pairs according to the essential matrix, where the pairs individually correspond to one of a plurality of regions of interest of the image data sets, and computes first and second rectified image data sets for at least some of the regions by respectively applying the corresponding first and second projective transforms to corresponding portions of the first and second image data sets. The video processor computes disparity values for pixel locations of a scene that includes at least portions of the regions of interest according to the rectified image data sets to construct a stereo disparity map using a stereo matching algorithm. In certain examples, the video processor further includes a hardware accelerator circuit to compute the projective transforms and the rectified image data sets, and the processor is programmed to compute the feature point correspondences and the essential matrix.

Further disclosed examples provide a non-transitory computer readable medium with computer executable instructions to compute feature point correspondences between temporally spaced first and second image data sets and an essential matrix that characterizes relative positions of a single camera that captured the image data sets at first and second times, and to compute first and second projective transform pairs according to the essential matrix which individually correspond to one of a plurality of regions of interest of the image data sets. The computer readable medium includes further instructions to compute first and second rectified image data sets for at least some of the regions of interest according to the corresponding projective transforms, and disparity values according to the rectified image data sets to construct a stereo disparity map.

DETAILED DESCRIPTION

Figure 1:
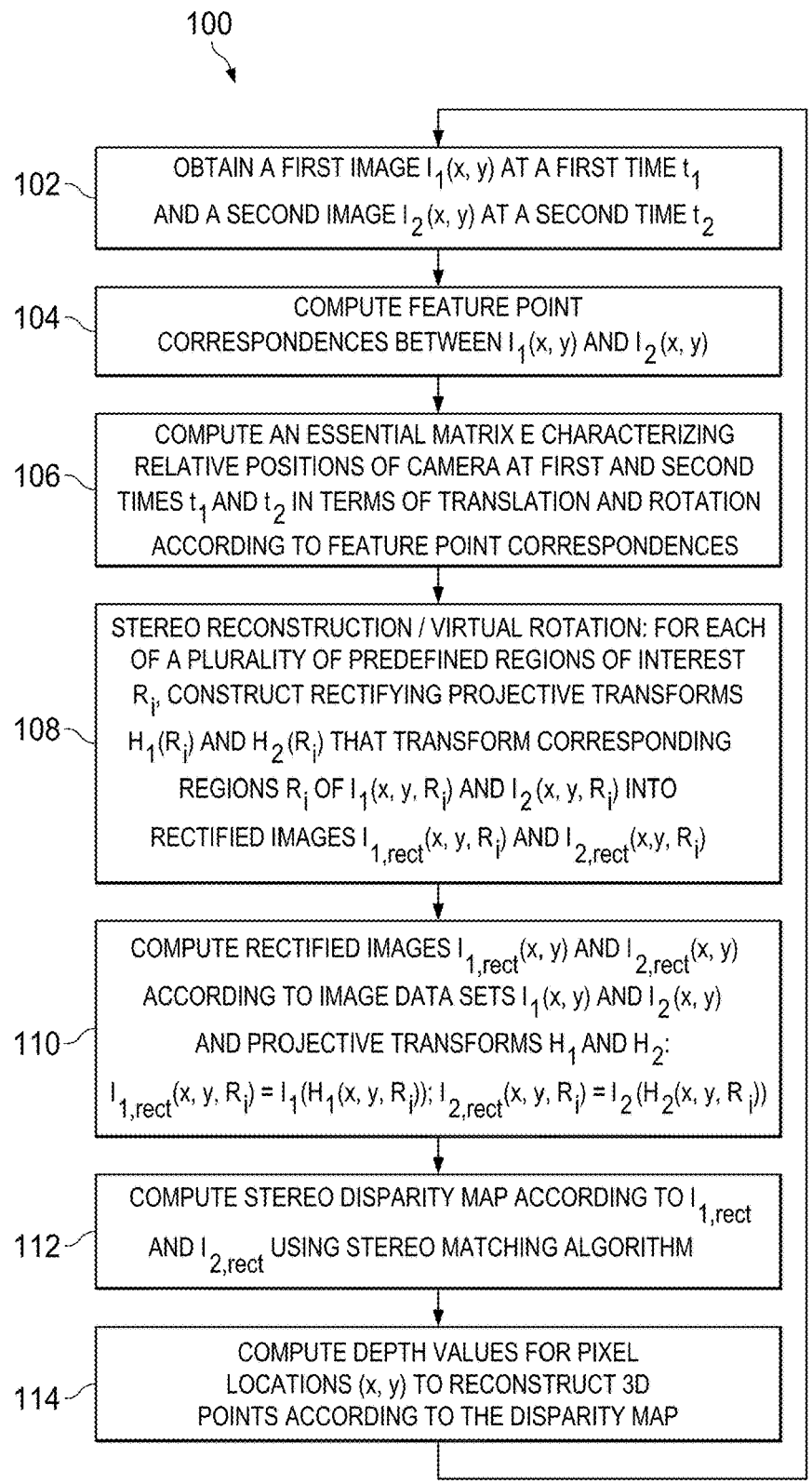
FIG. 1 is a flow diagram of an image processing method.

In the drawings, like reference numerals refer to like elements throughout, and the various features are not necessarily drawn to scale. In the following discussion and in the claims, the terms "including", "includes", "having", "has", "with", or variants thereof are intended to be inclu- FIG. 1 shows a process or method 100 for image processing, which can be used for a variety of end-use applications to reconstruct three-dimensional information from multiple image data sets obtained from a single camera (e.g., camera 202 in FIGS. 2-4 below) at first and second times. The method 100 generally includes image capture at 102 and computing or otherwise obtaining relative positions of a single camera at first and second times. For example, the relative camera positions can be obtained by computing feature point correspondences between the image data sets at 104 and computing an essential matrix at 106 to characterize the relative positions of the camera at first and second image capture times. In another example, accurate gyroscopes could provide the relative camera positions. The method 100 also includes computing pairs of first and second projective transforms at 108 that individually correspond to regions of interest in the image data, computing first and second rectified image data sets at 110 to align the feature point correspondences on a spatial axis, computing disparity values of a stereo disparity map at 112, and computing three-dimensional depth values at 114.

Figure 2:
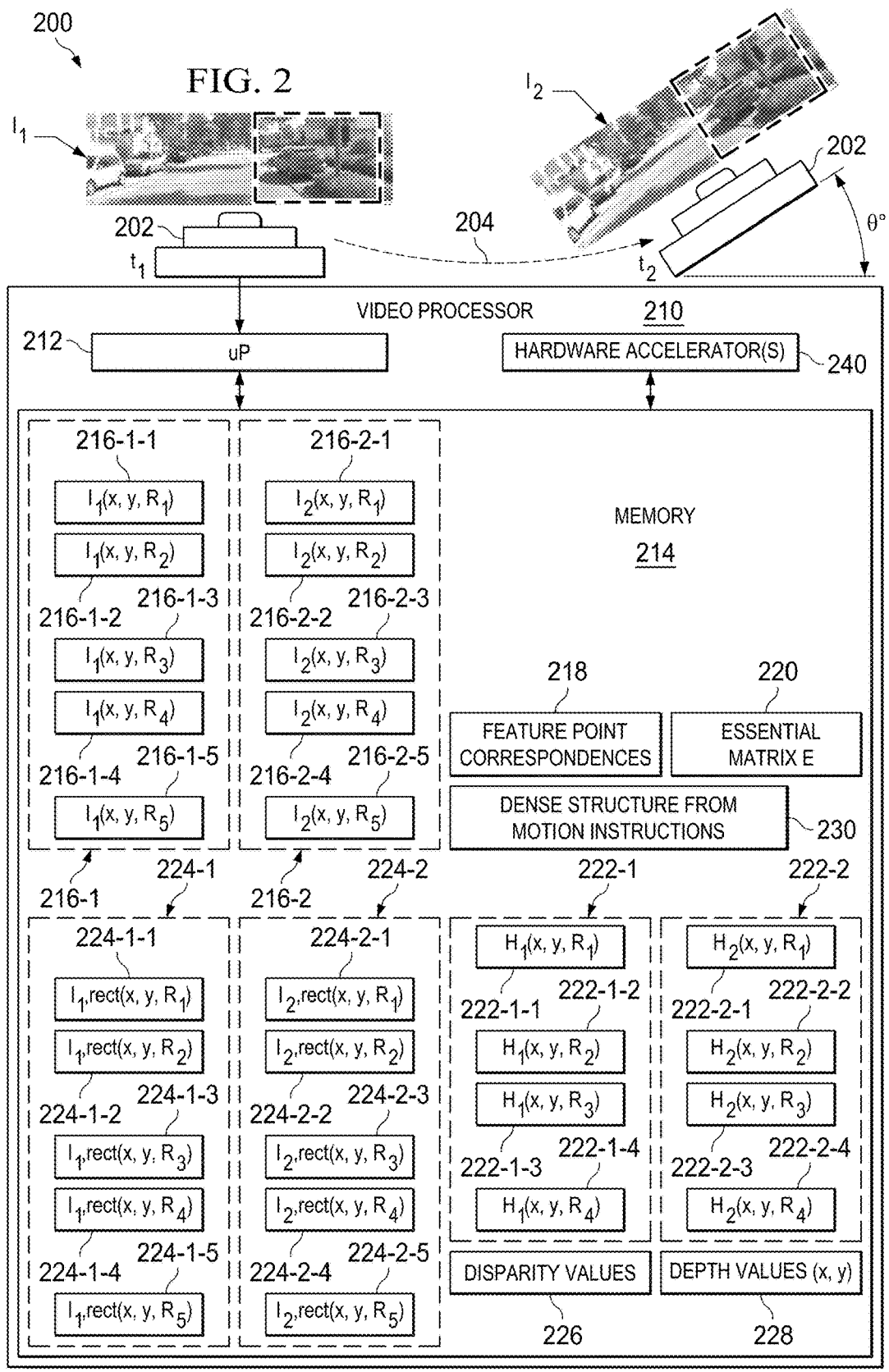
FIG. 2 is a schematic diagram of a single camera imaging system.

FIG. 2 illustrates a single camera imaging system 200 in which the method 100 can be implemented to reconstruct a three-dimensional 3D scene from temporally spaced image data sets 216-1 and 216-2 ($I_1(x, y)$ and $I_2(x, y)$). The imaging system 200 in FIG. 2 includes a single camera 202 and a video processor 210. The video processor 210 includes an electronic memory 214, and a processor 212 operatively coupled with the camera 202 and the electronic memory 214. In certain implementations, the video processor 210 further includes one or more hardware accelerator circuits 240. The video processor 210 in one example is an integrated circuit with suitable interconnections (not shown) to receive input image data from a connected camera 202 and interface circuitry to provide processed image data to a host system (not shown). The camera 202 is operative to obtain a first image data set 216-1 at a first time $t_1$ and a second image data set 216-2 at a second time $t_2$ (at 102 in the method 100 of FIG. 1). The processor 212 in one example is programmed to store the first and second image data sets at locations 216-1 and 216-2 in the memory 214. The process 100 is described in connection with pairs of two input image data sets, but can be used for processing more than two image data sets 216. The image data sets 216 include pixel values representing luminance and possible color for each of a plurality of pixel locations in a 2-dimensional space, including orthogonal "x" and "y" directions. The first image data set 216-1 ($I_1(x, y)$) and the second image data set 216-2 ($I_2(x, y)$) can be of any suitable x and y direction lengths.

The data sets 216 preferably have significant overlap in the x,y space field of view and certain presently disclosed examples can be used any time the relative camera motion is not pure rotation. In the example of FIG. 2, the camera 202 captures or obtains the first image data set $I_1$ at time $t_1$, and undergoes motion along a line 204. This relative camera motion represented by line 204 provides for a non-zero amount of camera translation as well as rotation shown by the angle θ. The video processor 210 stores the first and second image data sets 216 in the memory 214 as shown in FIG. 2. In this example, moreover, the processor 212 of the video processor 210 executes dense structure from motion (SfM) video processing instructions 230 stored in the memory 214 to implement real-time dense three-dimensional reconstruction in which the image domain or x,y data field is partitioned into multiple regions of interest (ROIs) 506 as described further below in connection with FIG. 5.

The system 200 uses Structure from Motion (SfM) techniques to reconstruct a three-dimensional scene from multiple images obtained from a single moving camera. As previously mentioned, high resolution or dense SfM methods are computationally expensive due to algorithmic complexity. Sparse reconstruction techniques, on the other hand, reconstruct fewer three-dimensional points than the total number of original image pixels, but many applications require high-density reconstruction in real time. Moreover, front or rear mounted vehicle camera applications present unique challenges to reconstruction accuracy and computational load for obstacle detection, vehicle control, environment mapping or other end usage of a reconstructed three-dimensional scene. Accordingly, the system 200 implements a method 100 for dense reconstruction and provides efficient implementation on embedded systems utilizing stereo vision techniques in combination with a single camera 202.

Figure 3:
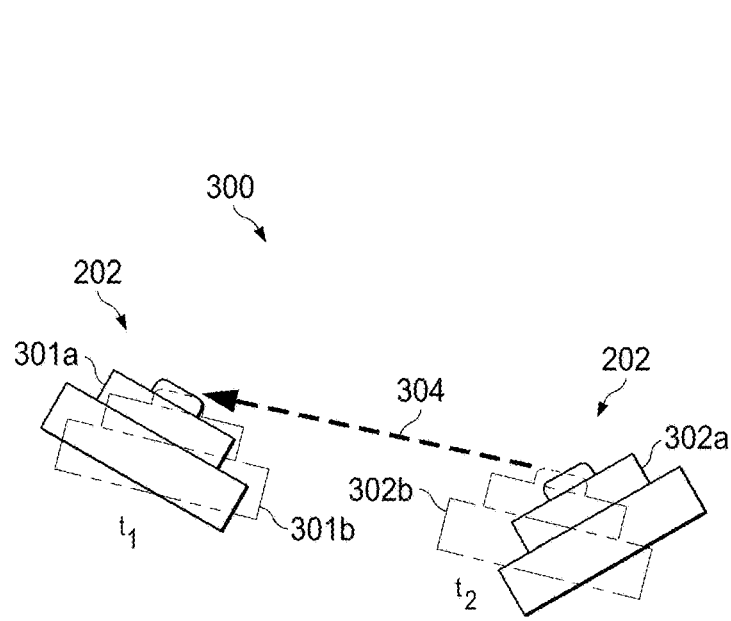
FIG. 3 is a simplified diagram of a single moving camera capturing image data sets at first and second positions and first times with relative rotation.
Figure 4:
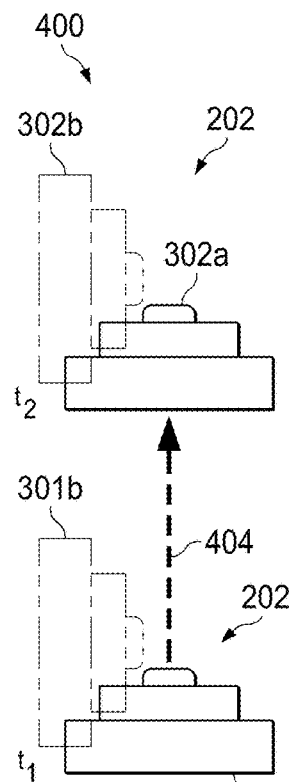
FIG. 4 is a simplified diagram of a single moving camera capturing image data sets at first and second positions and first times with linear motion along an optical axis without rotation.

Referring also to FIGS. 3 and 4, FIG. 3 provides a simplified view 300 of a single moving camera 202 capturing image data sets at first and second positions 301a and 302a, at corresponding first and second times $t_1$ and $t_2$ for a case in which the camera 202 rotates between the first and second positions 301a and 302a. FIG. 4 shows a simplified view 400 of the moving camera 202 capturing image data sets at first and second positions 301a and 302a at times $t_1$ and $t_2$, with generally linear camera motion along an optical axis 404 of the camera 202 without rotation. Disclosed examples provide virtual rotation through rectification of the captured image data 216 to effectively provide image data corresponding to virtually rotated camera positions. This, in turn, allows stereo three-dimensional image reconstruction using techniques previously available only to multiple camera systems. In FIGS. 3 and 4, for example, the virtual rotation provides for rotation of the camera 202 from the actual initial or first position and orientation 301a to a virtual position and orientation 301b, as well as providing rotation of the camera 202 at the second position from an initial position and orientation 302a to a virtual rotated position and orientation 302b. In FIG. 3, the relative positions of the camera 202 at the first and second times $t_1$ and $t_2$ can be characterized in terms of translation along the line 304 as well as the virtual rotation angles. Similarly, the relative camera at positions $t_1$ and $t_2$ can be characterized as translation along line 404 and a virtual rotation angle. As discussed further below, the system 200 and the method 100 accommodate a variety of different relative camera positions while facilitating three-dimensional image reconstruction. In operation, the camera 202 obtains the first and second image data sets 216-1 and 216-2, and the motion parameters (rotation and translation) between the two camera views can be estimated using methods of multiple view geometry, for example as set forth in R. Hartley and A. Zisserman, "Multiple view geometry in computer vision", Cambridge University Press, 2003. Motion parameters give rise to two projective transforms on the original images that result in rectified images. Rectified images in one example provide image point correspondences in the x-axis (horizontal). A stereo matching algorithm exploits this property by searching for the correspondences for each pixel, along the x-axis resulting in a dense disparity map. The disparity is inversely proportional to the depth of the imaged point, and can be used for efficient three-dimensional reconstruction. In general, dense SfM algorithms can be used for general camera motion where the baseline translation between the two camera views is non-zero, or equivalently, motion is not pure rotation, and reconstruction is possible where the two views have an overlapping field of view (FOV).

Figure 5:
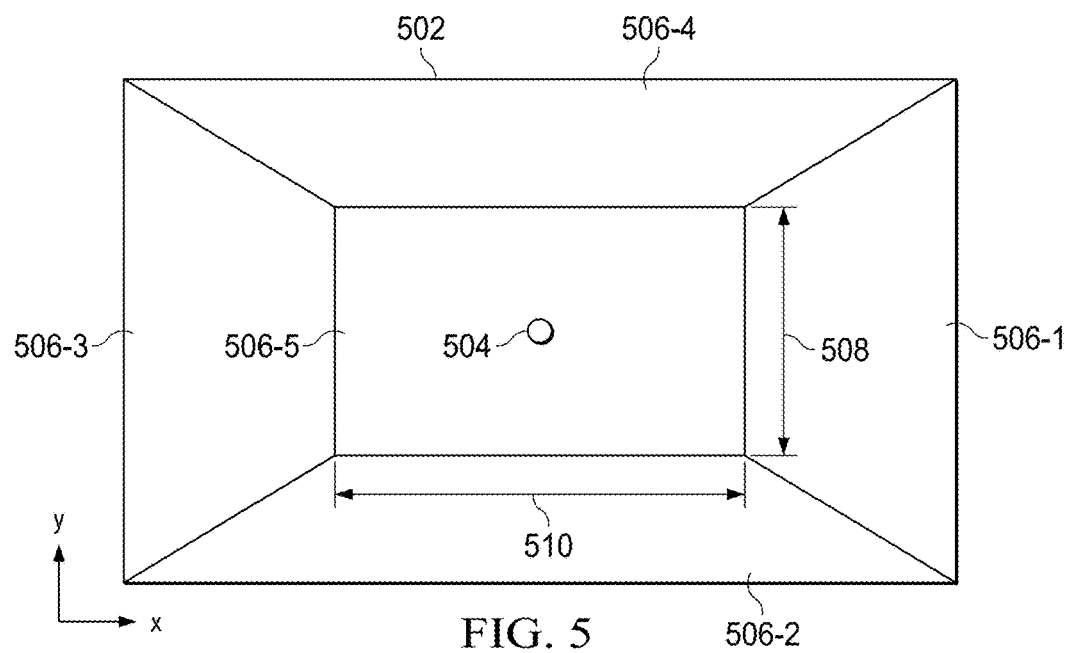
FIG. 5 is a simplified diagram showing partitioning of an image domain into right, lower, left, and upper outer regions of interest surrounding a center region that includes an image epipole.
Figure 6:
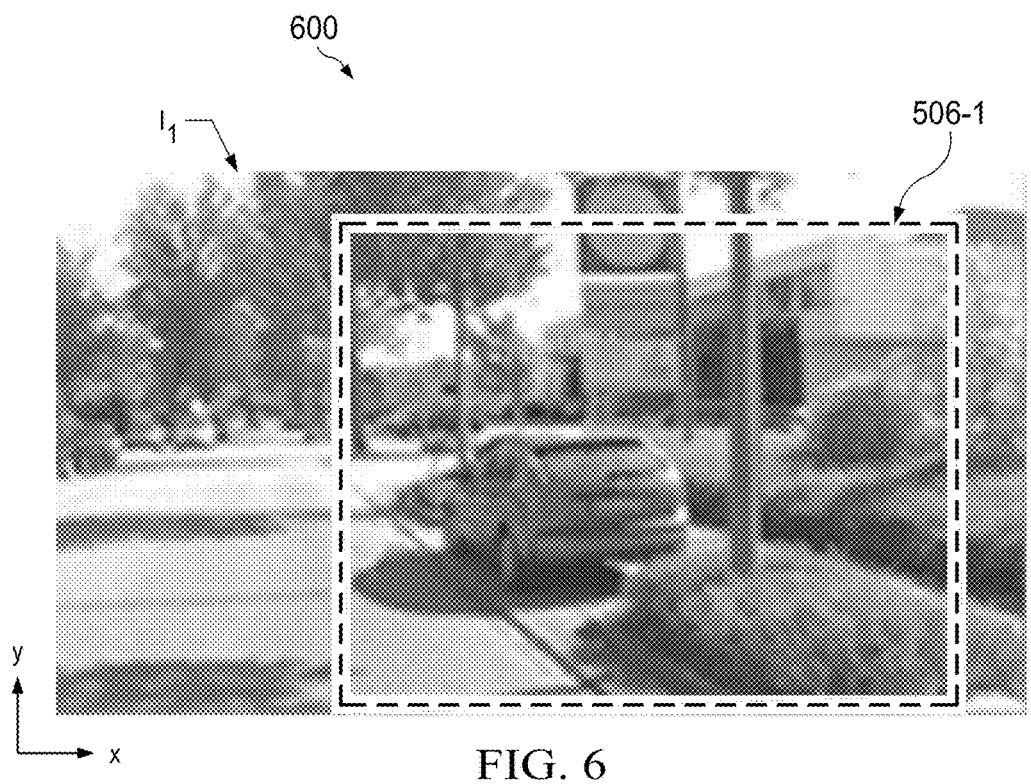
FIG. 6 is a first image including a first image data set.

FIG. 5 shows an example x, y rectangular image data range or domain 502 that includes regions of interest 506. In some examples, the regions of interest 506 are non-overlapping, although not a strict requirement for all implementations. The example of FIG. 5 includes a right region 506-1, a lower region 506-2, a left region 506-3 and an upper region 506-4, as well as a central region 506-5 that includes an epipole 504. The example in FIG. 5 represents a "forward" motion case as for example in the front or rear camera of a moving car, and can be used in the situation depicted in FIG. 4. For this type of motion, the epipole 504 (singularity) resides near the center of the image. The central region 506-5 in this example is generally rectangular, having a vertical or y-direction height 508 and a lateral or x-direction with 510. In other examples, other shapes of the central region 506-5 can be used. In this example, the central region 506-5 is disposed vertically between the lower region 506-2 and the upper region 506-4, and the region 506-5 is disposed laterally between the right region 506-1 and the left region 506-3. The epipole 504 in one example represents x,y pixel location or locations at or near an optical axis of a forward or rearward facing vehicle-mounted camera 202. At this location 504, video processing algorithms to detect depth in three dimensions lead to singularities at which no solution can be computed or algorithms require excessive amounts of processing resources to converge. In the case of a vehicle mounted camera 202, moreover, the central region 506-5 can be of suitable width 510 in order to accommodate typical left-right steering capabilities of a host vehicle, and the central region height 508 can be determined according to typical road gradient variations expected in use. In the example of FIG. 5, the outer regions 506-1 through 506-4 have inner boundaries at the edges of the central region 506-5 and outer boundaries generally corresponding to the rectangular image space range 502. The shapes of the regions of interest 506 in FIG. 5 are merely examples, and more or fewer regions of interest can be defined in other examples of any suitable shape for a given application. In one example, the regions of interest 506-1 through 506-5 are predefined, and the corresponding x,y locations in the region 506 are stored in the video processor memory 214. In other examples, the regions of interest can be redefined dynamically according to any suitable criterion. In the illustrated example, four outer regions 506-1 through 506-4 are used for stereo reconstruction and virtual rotation to facilitate stereo reconstruction while selectively mitigating computational difficulties associated with data at or near the epipole 504 to enhance computational efficiency and provide for real time three-dimensional image reconstruction for a variety of uses. In particular, the disclosed techniques advantageously facilitate three-dimensional reconstruction in real time for vehicle mounted cameras, with the resulting three-dimensional data being available for obstacle detection, vehicle control, environment mapping or other applications.

The processor 212 in certain examples stores portions or regions of the first and second image data sets 216 at 102 in FIG. 1 in corresponding sections of the memory 214 as shown in FIG. 2. These include first and second data set portions 216-1-1 and 216-2-1 associated with the first region of interest 506-1 corresponding to the right portion of a rectangular image space as shown in FIG. 5, as well as data set portions 216-1-2 and 216-2-2 associate with a second lower region of interest 506-2, data set portions 216-1-3 and 216-2-3 associated with a left or third region of interest 506-3, and data set portions 216-1-4 and 216-2-4 associated with an upper or top region of interest 506-4. In addition, and certain examples, the processor 212 stores the image data portions 216-1-5 and 216-2-5 respectively associated with the first and second images $I_1$ and $I_2$ in the memory 214. As seen in FIG. 2, the image portions 216 include one or more image data values associated with a particular x,y location and a particular one of the five regions of interest 506-1 through 506-5, indicated by an index $R_i$, where i—1-5.

At 104 in FIG. 1, the video processor 210 computes a plurality of feature point correspondences 218 between the first and second image data sets 216-1, 216-2. The individual feature point correspondences 218 correlate a pixel location of the first image data set 216-1 and a pixel location of the second image data set 216-2 for which the image data match. Exact matching is not required, and approximate matching of a minimum accuracy can be used in computing the correspondences 218.

At 106, the video processor 210 computes an essential matrix 220 (E) that characterizes relative positions of the single camera 202 at the first and second times $t_1$, $t_2$ according to the feature point correspondences 218. In certain examples, the essential matrix 220 is computed only for a subset of pixel locations of the image data sets 216-1 and 216-2. In one example, the essential matrix 220 is a 3×3 matrix with values corresponding to orthogonal "x", "y" and "z" axes in three-dimensional space which encodes the estimated motion (rotation and translation) between the two camera views. From this essential matrix 220, the video processor 210 can extract translation and rotation information using suitable techniques, such as singular value decomposition in one example. Various other techniques can be used to compute the feature point correspondences at 104, for example, feature descriptor matching as described in H. Bay, et al. "Speeded-up robust features (SURF)." Computer vision and image understanding 110.3 (2008), pages 346-359, sparse optical flow (OF) as described in B. Lucas and T. Kanade, "An iterative image registration technique with an application to stereo vision," in International Joint Conference on Artificial Intelligence, 1981, pages 674-679, or dense optical flow (OF) as described in S. Baker, et al. "A database and evaluation methodology for optical flow." International Journal of Computer Vision 92.1 (2011), pages 1-31.

At 108, for at least some of the individual regions of interest 506, the video processor 202 computes a plurality of pairs of first and second projective transforms 222 ($H_1R_i$ and $H_2R_i$) according to the essential matrix 220. In one example, the projective transforms 222 are computed using a hardware accelerator circuit 240 of the video processor 210. The processor 210 stores the projective transforms $H_1R_i$ and $H_2R_i$ at corresponding locations 222-1 and 222-2 in the memory 214. The pairs of the first and second projective transforms 222-1, 222-2 individually correspond to one of a plurality of regions of interest 506 of the first and second image data sets 216-1, 216-2. In one example, the projector transform pairs 222 are computed at 108 for only the outer regions of interest 506-1 through 506-4. These are shown in FIG. 2 as projective transforms 222-1-1 and 222-2-1 corresponding to the first region of interest 506-1, projective transforms 222-1-2 and 222-2-2 corresponding to the second region of interest 506-2, projective transforms 222-1-3 and 222-2-3 corresponding to the third region of interest 506-3 and projective transforms 222-1-4 and 222-2-4 corresponding to the fourth region of interest 506-4. The projective transforms 222 are used for image rectification by virtual camera rotation to facilitate stereo reconstruction using the original image data obtained using a single camera 202.

The computation at 108 yields projective transforms $H_1$ and $H_2$ for each analyzed region of interest 506-1 through 506-4 that transform the corresponding portions of the first and second image data sets $I_1$ and $I_2$ into rectified data sets $I_{1,rect}$ and $I_{2,rect}$ that satisfy the following equations (1):

$$I_{1,rect}(x,y,R_i)=I_i(H_1(x,y)), \text{ and } I_{2,rect}(x,y)=I_2(H_2(x,y)) \qquad (1)$$

Corresponding points in the rectified image data sets $I_{1,rect}$ and $I_{2,rect}$ are aligned in the x-axis in this example, or point correspondence is along another spatial access in other examples. Rectification is used in dual camera (stereo) systems, such as two cameras mounted on a structure next to each other. Such stereo systems are usually designed such that the geometric configuration of the two cameras causes the images to be almost rectified without further image processing. Since typical multi-camera configurations include small inaccuracies, small projective corrections are applied for rectification. Typically, however, the rectifying transforms are computed once in a "stereo system calibration" step, and the transforms are applied repeatedly at run-time. Stereo system calibration is typically simplified by the fact that the images are almost rectified already due to the geometric configuration of the cameras. A rectification algorithm for stereo calibration is described in E. Trucco, and A. Verri. Introductory techniques for 3-D computer vision. Vol. 201. Englewood Cliffs: Prentice Hall, 1998, Ch. 7.3.7. "Rectification", incorporated by reference herein.

In the system 200, the stereo rectification process at 108 of FIG. 1 operates to virtually rotate the two camera views to obtain an "ideal stereo configuration" (two views that are aligned in a way to provide perfectly rectified images). This concept is illustrated in FIG. 3, where the actual first and second positions or locations 301a and 302a of the camera 202 are shown along with the virtually rotated camera positions 301b and 302b. When the camera movement over time results in a relative orientation or configuration similar to that of a dual camera stereo rig, such as in FIG. 3, the virtual rotation angles θ are fairly small. The situation in FIG. 4, however, is very dissimilar to a classical stereo rig, and the virtual rotation angle is large (e.g., up to 90 degrees). Thus, dual camera stereo systems deal with the fairly small angles, stereo rectification is fairly straightforward. In order to implement real-time single camera rectification, the video processor 210 performs a separate rectification for virtual rotation for each pair of image data sets 216, and selectively performs the rectification of the captured image data.

As seen in FIGS. 3 and 4, dense structure from motion (SfM) can be used to account for general motion of the single camera. A problem occurs in the situation shown in FIG. 4, in which the epipole is shown near the center of the image at 504 in FIG. 5. The epipole 504 in this case lies inside the image, whereas for an ideal stereo con dual camera figuration, or a moving camera in the situation of FIG. 4, the epipole lies at infinity along the x-axis. The epipole 504, moreover, results in a computational singularity around which three-dimensional reconstruction is extremely difficult (and theoretically impossible at the epipole itself), because there is very little disparity between corresponding points. Accordingly, simple dual camera techniques cannot be used because the epipole presents a singularity.

In the disclosed system, the camera image is divided into the four outer regions of interest 506-1 through 506-4, which exclude the epipole 504. The rectification is performed on these outer regions of interest 506-1 through 506-4 in order to implement dense SfM processing through individualized rectification. The modified rectification in one example includes a rectified rotation for the right-hand side region of interest 506-1Rrect(right) given by the following equation (2):

$$Rrect(right)=(e1,e2,e3)^T \qquad (2)$$

where e1, e2 and e3 are orthonormal column vectors derived from the essential matrix 220, and "T" is a transpose operation. In one example, the vector set e1, e2 and e3 is given by the following equations (3):

$e1$=camera translation vector $e2=e1\times(1,0,0)^T$ $$e3=e1\times e2 \qquad (3)$$

where "x" denotes the vector cross product. The rectifying rotation (Rrect(right)) for the first or "right" region of interest 506-1 of FIG. 5 in this example is set as the camera translation vector. The virtual rotations (Rrect) for the other ROIs 502-2, 506-3 and 506-4 are obtained by subsequent rotations of α=90, 180 and 270 degrees around the translation vector (which equals the x-axis in the rectified system) according to the following vector equation (4):

$$Rrect=Rx(\alpha)Rrect(right) \qquad (4)$$

where Rx(α) is given by the following matrix formula (5):

$$Rx(\alpha) = \begin{bmatrix} 1 & 0 & 0 \\ 0 & \cos\alpha & \sin\alpha \\ 0 & -\sin\alpha & \cos\alpha \end{bmatrix} \qquad (5)$$

In this example, α=90 degrees for the region 506-2, α=180 degrees for the region 506-3 and α=270 degrees for the region 506-4. For each of the outer regions 506-1 through 506-4, remaining the rectification processing steps can be performed in similar fashion to a conventional stereo rectification process using intrinsic camera parameters, where each rotation induces unique two-dimensional projective transforms $H_1$ and $H_2$ on the input image portions. The video processor 210 stores the resulting projective transforms 222 in the electronic memory 214 as shown in FIG. 2.

Below is a Matlab code example that implements a rectification algorithm to obtain the projective transforms $H_1$ and $H_2$.

```
%given:
% t - 3×1 vector, translation of camera from view 1 to view 2
% R - 3×3 matrix, rotation of camera from view 1 to view 2
% K - 3×3 matrix, intrinsic camera parameter matrix of the form:
%    [focal_length    0               horizontal_center;
%     0               focal_length    vertical_center;
%     0               0               1];
% alpha - 1×1 scalar,
%    0           for "ROI right"
%    pi/2        for "ROI down"
%    pi          for "ROI left"
%    3*pi/2      for "ROI up"
  %% RECTIFICATION
e1 = t/norm(t)
e2 = cross([1;0;0],e1);
e2 = e2/norm(e2);
e3 = cross(e1,e2);
Rrect = [e1';e2';e3'];
Ralpha =    [1           0              0;
             0           cos(alpha)     sin(alpha);
             0           -sin(alpha)    cos(alpha)];
```

```
Rrect = Ralpha*Rrect;
R1 = R * Rrect; %R1 - 3×3 matrix, virtual rotation to be applied to
camera view 1
R2 = Rrect;   %R2 - 3×3 matrix, virtual rotation to be applied to camera
view 2
% note: inv( ) is matrix inverse
H1 = K*inv(R1)*inv(K); %H1 - 3×3 matrix, projective transform for
image 1
H2 = K*inv(R2)*inv(K); %H2 - 3×3 matrix, projective transform for
image 2
```

At 110 in FIG. 1, for at least some of the individual regions of interest 506, the video processor 202 computes first and second rectified image data sets 224-1, $I_{1,rect}$(x, y, $R_i$) 224-2, $I_{2,rect}$(x, y, $R_i$) in which the feature point correspondences 218 of the region are aligned on a spatial axis x. The video processor 202 computes the first and second rectified image data sets 224-1, 224-2 for a given outer region of interest 506 by respectively applying the corresponding first and second projective transforms 222-1, 222-2 to corresponding portions of the first and second image data sets 216-1, 216-2. In one example, the video processor 202 computes the above equation (1) to apply the projective transforms $H_1$ and $H_2$ on images $I_1$ and $I_2$ on a region by region basis in order to obtain rectified images $I_{1,rect}$ and $I_{2,rect}$. Down-sampling factors in x and y can be used in some examples to keep the size of the rectified images reasonable, where rectified images may otherwise grow large due to perspective distortion. In one example, the rectified image portions 224-1 and 224-2 are stored separately as shown in FIG. 2, and can be combined with the un-rectified image data 216-1-5 and 216-2-5 of the center region 506-5 to construct a composite rectified image set 224.

Figure 7:
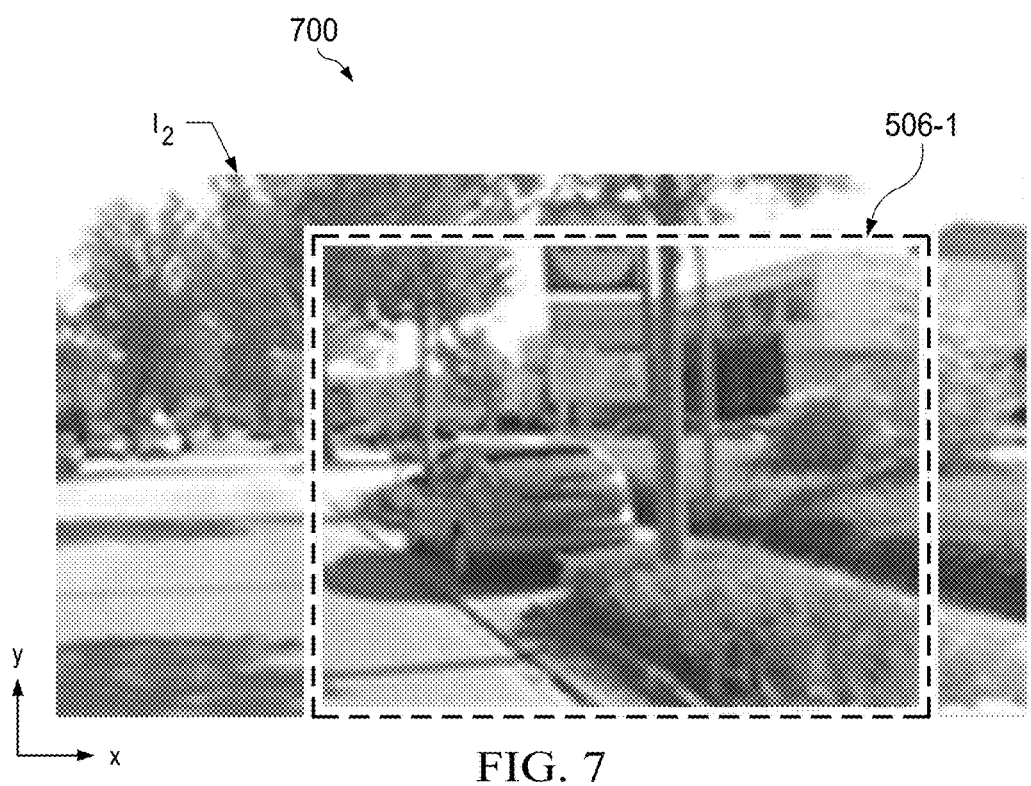
FIG. 7 is a second image including a second image data set.
Figure 8:
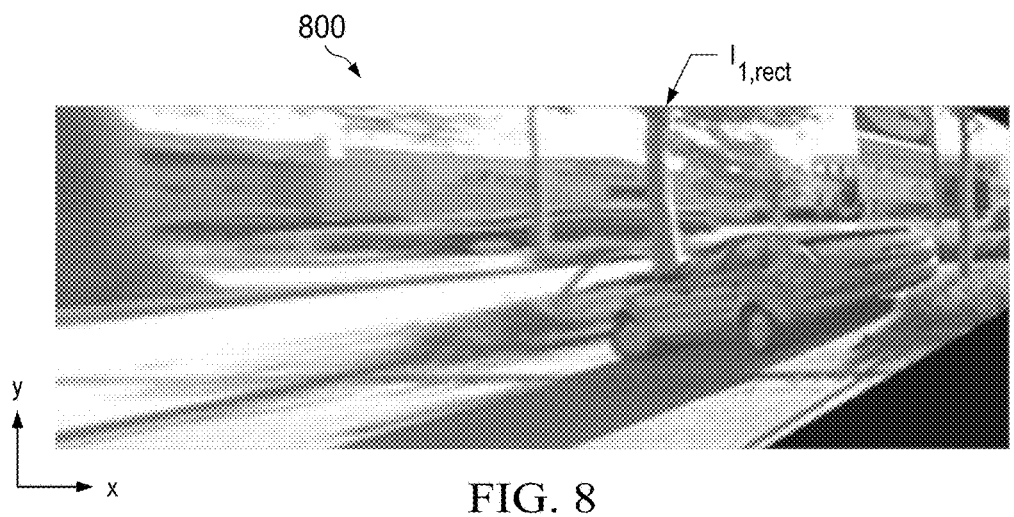
FIG. 8 is a first rectified image.
Figure 9:
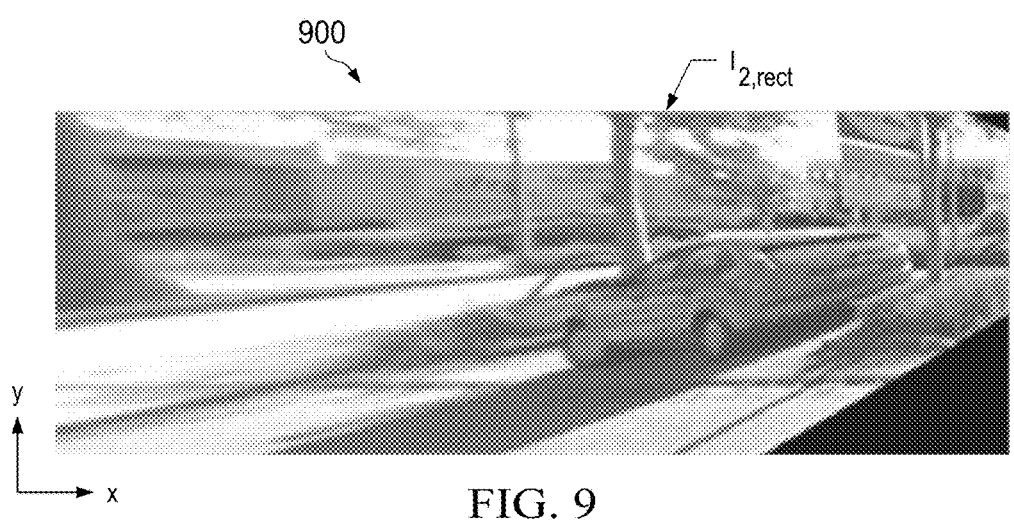
FIG. 9 is a second rectified image.

Referring also to FIGS. 6-9, FIG. 6 shows an example of image data 600 including a first ROI 506-1 which is a portion of the first image data set $I_1$, and FIG. 7 shows an example of image data 700 including the first ROI 506-1 of a second image data set $I_2$. The images in FIGS. 6 and 7 were obtained at times $t_1$ and $t_2$ using a single forward-facing vehicle mounted camera during forward vehicle motion. FIG. 8 shows a portion of a first rectified image 800 ($I_{1,rect}$) resulting from computation of the first rectified data set 224-1-1 corresponding to the first ROI 506-1. FIG. 9 shows a portion of the second rectified image 900 ($I_{2,rect}$) resulting from computation of the second rectified data set 224-2-1 corresponding to the first ROI 506-1.

Figure 10:
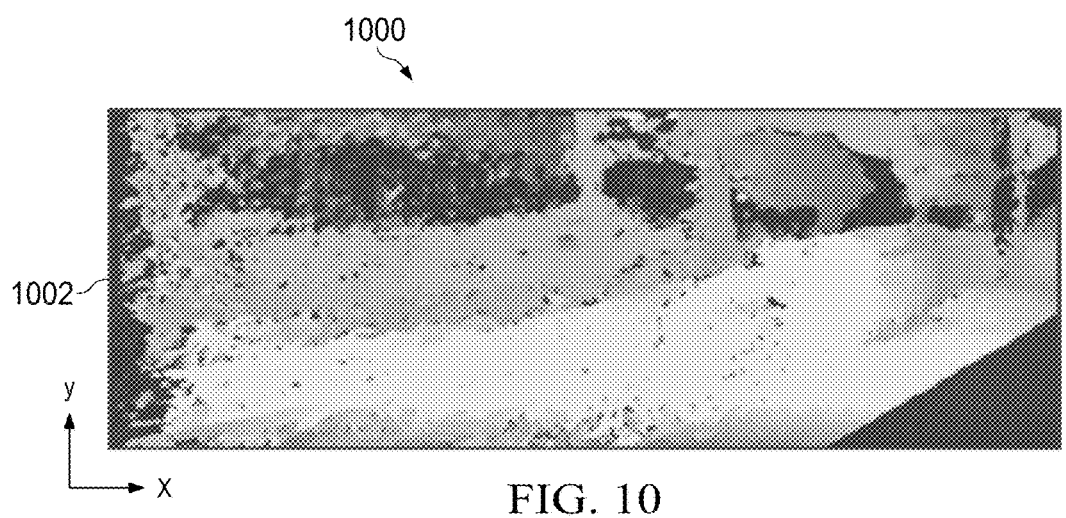
FIG. 10 is a disparity map image.

At 112 in FIG. 1, the video processor 120 computes disparity values 226 for pixel locations x, y of the scene to form a disparity map image 1002 shown in FIG. 10. The disparity data 224 includes at least portions of the plurality of regions of interest 506 according to the rectified image data sets 224-1, 224-2. This results in a stereo disparity map 1002 computed using a stereo matching algorithm. One suitable stereo mapping algorithm is set forth in H. Hirschmüller. "Stereo processing by semiglobal matching and mutual information." Pattern Analysis and Machine Intelligence, IEEE Transactions on 30.2 (2008), pages 328-341.

At 114, the video processor 120 computes depth values 228 for the pixel locations x, y of the scene according to the disparity values 226. This computes or reconstructs three dimensional points for each pixel location by converting the disparity value into depth. In one example, the video processor 120 performs stereo triangulation to compute a depth value "depth" for each pixel location at 114 according to a baseline translation magnitude and the corresponding disparity value "disparity" using the following equation (6):

$$\text{depth}=(\text{focal length})(\text{translation magnitude}=\text{baseline})/(\text{disparity}). \quad (6)$$

In this example, the depth values 228 are computed is with respect to the virtually rotated camera 202. In other examples, the depth values can be converted to relate to the original camera view by rotating the three-dimensional points with the inverse of the virtual rotation applied for rectification at 108.

In certain examples, the method 100 in FIG. 1 returns to 102 to obtain a new pair of first and second image data sets. In certain implementations, this can simply be capturing a new image data set, and performing the process 100 with respect to the previously obtained image and the newly obtained image. In certain examples, the video processor 120 includes a programmable processor 212 as well as one or more hardware accelerator circuits 240 as shown in FIG. 2. In one implementation, the processor 212 is programmed to compute the feature point correspondences 218 and the essential matrix 220 (e.g., at 104 and 106 in FIG. 1), and the hardware accelerator circuit 240 computes the projective transforms 222 and the rectified image data sets 224 (at 108 and 110).

In certain implementations, a programmed processor (e.g., processor 212 in FIG. 2) is used to implement the method 100 of FIG. 1. As discussed above, further aspects of the present disclosure provide a non-transitory computer readable medium (e.g., the electronic memory 214 in FIG. 2) that includes computer executable instructions (e.g., instructions 230) which, when executed by the processor 212, cause the processor 212 to implement the above described methods 100.

The disclosed examples provide solutions to the difficult forward motion case of SfM by dividing the image into regions of interest 506 so as to exclude the epipole 504 from the image. Dense SfM reconstruction is applied to these regions separately. The Dense SfM algorithm is designed to leverage efficient implementations of stereo vision algorithms, optical flow (OF) algorithms and lens distortion correction (LDC) algorithms in embedded systems. OF has many applications (moving object detection, motion estimation, etc.), and can provide the point matches at 104. LDC is typically used to perform image transforms that correct for camera lens distortions, and can be reused in Dense SfM to carry out the projective transforms at 108. Stereo matching HWA can be used with two synchronized camera inputs from a stereo camera rig, and can be used at 112 to operate on consecutive, rectified frames from one camera. One advantage of applying algorithms at 108-114 as opposed to standard point-wise triangulation is that advanced stereo matching algorithms are likely more successful in matching dense regions, since the search space (x-axis only) is simplified compared to OF (general x-y plane). The disclosed methods 100, moreover, can be applied to all camera motions of a single camera that are not purely rotational, and may find utility in automotive applications, robotics, drones, industrial applications, etc.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. A method comprising:
   determining relative camera positions of a single camera associated with first image data set obtained at a first time and a second image data set obtained at a second time;
   computing a first projective transform and a second projective transform based in part on the determined relative camera positions, the first projective transform corresponding to a first region of interest of the first and second image data sets and the second projective transform corresponding to a second region of interest of the first and second image data sets, wherein both the first and second region of interests of the first and second image data sets excludes an epipole;
   computing first rectified image data set based in part on the first projective transform;
   computing second rectified image data set based in part on the second projective transform, wherein corresponding points in the first rectified image data set and second rectified image data set are aligned on a spatial axis;
   calculating disparity values for a pixel location using the computed first and second rectified image data sets; and
   generating a disparity map image using the calculated disparity values for the pixel location.

2. The method of claim 1, further comprising computing depth values for the pixel location of the scene according to the disparity values.

3. The method of claim 1, wherein determining the relative camera positions includes:
   computing the feature point correspondences between the first and second image data sets, the feature point correspondences individually correlating a pixel location of the first image data set and a pixel location of the second image data set for which the image data match; and
   computing an essential matrix that characterizes relative positions of the single camera at the first and second times according to the feature point correspondences.

4. The method of claim 1, wherein the regions of interest include a right region, a lower region, a left region, an upper region, and a central region that includes the epipole, the central region disposed vertically between the lower region and the upper region, and the central region disposed laterally between the right region and the left region.

5. The method of claim 4, further comprising computing the pairs of first and second projective transforms for only the right region, the lower region, the left region, and the upper region.

6. The method of claim 5, further comprising computing the first and second rectified image data sets for only the right region, the lower region, the left region, and the upper region.

7. The method of claim 4, further comprising computing the first and second rectified image data sets for only the right region, the lower region, the left region, and the upper region.

8. The method of claim 4, wherein the first and second projective transforms are computed to compensate rotation of the single camera between the first and second times to facilitate virtual rotation of the image data from the single camera in computing the first and second rectified image data sets.

9. The method of claim 1, wherein the first and second projective transforms are computed to compensate rotation of the single camera between the first and second times to facilitate virtual rotation of the image data from the single camera in computing the first and second rectified image data sets.

10. The method of claim 1, further comprising determining the relative camera positions using a processor, and computing the projective transforms and the rectified image data sets using a hardware accelerator circuit.

11. An imaging system, comprising:
    a single camera to obtain a first image data set at a first time and a second image data set at a second time; and
    a video processor configured to:
      determine relative camera positions of the single camera associated with the first image data set and the second image data set,
      compute a first projective transform and a second projective transformed based in part on the determined relative camera positions, the first projective transform corresponding to a first region of interest of the first and second image data sets and the second projective transform corresponding to a second region of interest of the first and second image data sets, wherein both the first and second regions of interest of the first and second image data sets excludes an epipole,
      compute first rectified image data set based in part on the first projective transform;
      compute second rectified image data set based in part on the second projective transform, wherein corresponding points in the first rectified image data set and second rectified image data set are aligned on a spatial axis,
      calculating disparity values for a pixel location using the compound first and second rectified image data sets; and
      generating a disparity map image using the calculated disparity values for the pixel location.

12. The imaging system of claim 11,
    wherein the processor is programmed to determine the relative camera positions; and
    wherein the video processor further includes at least one hardware accelerator circuit to compute the projective transforms and the rectified image data sets.

13. The imaging system of claim 11, wherein the video processor is configured to determine the relative camera positions by:
    computing a the feature point correspondences between the first and second image data sets, the feature point correspondences individually correlating a pixel location of the first image data set and a pixel location of the second image data set for which the image data match; and
    computing an essential matrix that characterizes relative positions of the single camera at the first and second times according to the feature point correspondences.

14. The imaging system of claim 11, wherein the regions of interest include a right region, a lower region, a left region, an upper region, and a central region that includes the epipole, the central region disposed vertically between the lower region and the upper region, and the central region disposed laterally between the right region and the left region.

15. The imaging system of claim 14, wherein the video processor is configured to compute the pairs of first and second projective transforms for only the right region, the lower region, the left region, and the upper region.

16. The imaging system of claim 14, wherein the video processor is configured to compute the first and second rectified image data sets for only the right region, the lower region, the left region, and the upper region.

17. The imaging system of claim 14, wherein the video processor is configured to compute the first and second projective transforms to compensate rotation of the single camera between the first and second times to facilitate virtual rotation of the image data from the single camera in computing the first and second rectified image data sets.

18. A non-transitory computer readable medium, comprising computer executable instructions which, when executed by a processor, cause the processor to:
   determine relative camera positions of a single camera associated with first image data set obtained at a first time and a second image data set obtained at a second time;
   compute a first projective transform and a second projected transform based in part on the determined relative camera positions, of the first projective transform corresponding to a first region of interest of the first and second image data sets and the second projective transform corresponding to a second region of interest of the first and second image data set, both the first and second regions of interest of the first and second image data sets excludes an epipole;
   compute first rectified image data set based in part on the second projective transform;
   compute second image data set based in part on second projective transform, wherein corresponding points in the first rectified image data set and second image data set;
   calculating disparity values for a pixel location using the computed first and second rectified image data sets;
   generating a disparity map image using the calculated disparity values for the pixel location.

19. The non-transitory computer readable medium of claim 18, further comprising computer executable instructions to cause the processor to:
   compute the feature point correspondences between the first and second image data sets, the feature point correspondences individually correlating a pixel location of the first image data set and a pixel location of the second image data set for which the image data match; and
   compute an essential matrix that characterizes relative positions of the single camera at the first and second times according to the feature point correspondences.

20. The non-transitory computer readable medium of claim 18, further comprising computer executable instructions to cause the processor to:
   compute the first and second rectified image data sets for only the regions of interest that exclude the epipole.

* * * * *